United States Patent [19]

Hong

[11] Patent Number: 4,807,932
[45] Date of Patent: Feb. 28, 1989

[54] DEVICE FOR MOVING AN AUTOMOBILE SEAT BACK AND FORTH

[75] Inventor: Bahk Hong, Yougsan-ku, Rep. of Korea

[73] Assignee: Kia Motors Corporation, Rep. of Korea

[21] Appl. No.: 85,877

[22] Filed: Aug. 13, 1987

[51] Int. Cl.$^4$ .............................................. B60M 1/08
[52] U.S. Cl. .................................... 297/346; 248/419; 297/344
[58] Field of Search ............... 297/344, 345, 346, 235, 297/409, 378, 379; 248/419, 421; 296/65 R

[56] References Cited

U.S. PATENT DOCUMENTS

| | | | |
|---|---|---|---|
| 121,563 | 12/1871 | Warren et al. | 297/235 |
| 156,709 | 11/1874 | Mellinger et al. | 297/235 X |
| 177,526 | 5/1876 | Lawrence | 297/345 X |
| 283,370 | 8/1883 | Bauer | 297/235 |
| 284,153 | 8/1883 | Willits | 297/235 X |
| 321,625 | 7/1885 | Mellinger | 296/65 R |
| 340,948 | 4/1886 | Hutton et al. | 297/235 |
| 3,049,330 | 8/1962 | Coons et al. | 248/419 |
| 3,189,312 | 6/1965 | Bilancia | 297/346 X |
| 3,294,437 | 12/1966 | Belsky et al. | 296/65 R |
| 4,046,349 | 9/1977 | MacAfee | 297/344 X |

FOREIGN PATENT DOCUMENTS

| | | | |
|---|---|---|---|
| 897427 | 3/1945 | France | 248/419 |
| 1095113 | 5/1955 | France | 297/378 |
| 12347 | 1/1985 | Japan | 296/65 R |

*Primary Examiner*—Peter A. Aschenbrenner
*Assistant Examiner*—Thomas A. Rendos
*Attorney, Agent, or Firm*—Hill, Van Santen, Steadman & Simpson

[57] ABSTRACT

A device for moving an automobile seat back and forth is provided. The device comprises a seat bracket attached to a main seat having an auxiliary seat, a fixed bracket secured to the bottom of the automobile, and trapezoidal legs hinged to the brackets by means of bolts located at the longer sides of said legs. Each leg is adapted to move back and forth along an arc-shaped path at the axis of each bolt as the seat moves back and forth. Each leg also has contacting sides adapted to selectively contact the brackets, depending on the movement of legs, and a pin. The device also comprises a linkage adapted to receive the pins of the legs so that movement of the seat can be constrained at the moved position thereof.

16 Claims, 3 Drawing Sheets

DEVICE FOR MOVING AN AUTOMOBILE SEAT BACK AND FORTH

TECHNICAL FIELD OF THE INVENTION

The present invention generally relates to a device for moving an automobile seat back and forth. More specifically, the present invention relates to a device for moving back and forth a main seat having an auxiliary seat.

BACKGROUND OF THE INVENTION

In the modern automobile manufacturing industry, automobiles are typically made by mass production. Therefore, it is impossible to make automobiles that are specifically designed for the specific physical attributes of the resultant passengers including the driver. Especially, it is difficult to design a seat which is comfortable for all passengers except in those cases wherein the seat is made to order. Accordingly, to address the above discussed concern, there has been utilized a device which can move the seat back and forth. The device has a pair of rails on which the seat is supported, and the passenger controls the seat position to adjust it to satisfy his physical attributes.

In the case of a vehicle that can accomodate a lot of passengers, such as bus, the seat device is used with a seat arrangement system in which two seats are so arranged so that passengers in opposite seats face each other, that is one of the said two seats is fixed in a 180° different position.

However, the 180° turning position system does not provide the required space, but only provides a position in which the passengers in opposite seats can face each other. Similarly, in the case of the arrangement in which the seat is supported on the rail, the legs of the seat scratch the bottom of the automobile, this is especially, acute when the automobile has carpet on the bottom portion because the legs will tear it as they move.

Therefore, there is a need for an improved device for moving an automobile seat.

SUMMARY OF THE INVENTION

An advantage of the present invention is to provide a device for moving a seat that solves the above mentioned problems encountered in prior art seats for automobiles.

The present invention provides a device for moving an automobile seat back and forth. The device comprises trapezoidal legs hinged at mounting brackets fixed on the bottom of the automobile. Because the seat can be moved back and forth at the hinge point, problems such as abrasion and scratching can be easily avoided.

The foregoing and other objects, features and advantages of the present invention will become apparent from the following description of the presently preferred embodiment and accompanying drawings.

DETAILED DESCRIPTION OF THE PRESENTLY PREFERRED EMBODIMENTS

Figure 1:
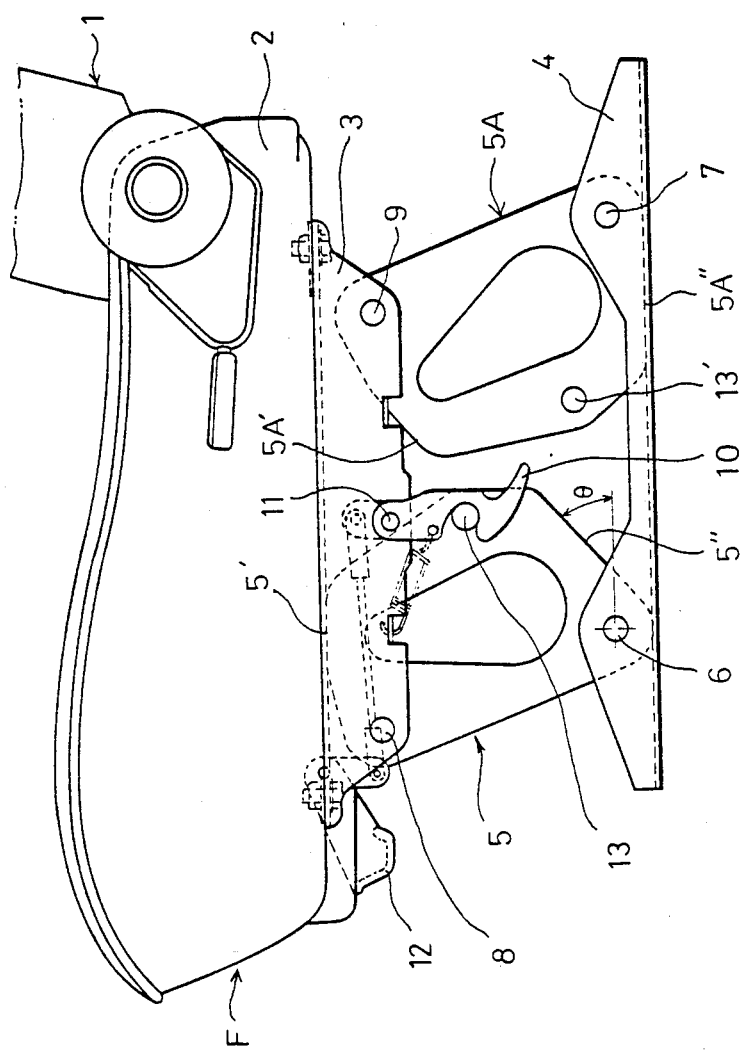
FIG. 1 illustrates a side view of a device for moving an automobile seat of the present invention.
Figure 2:
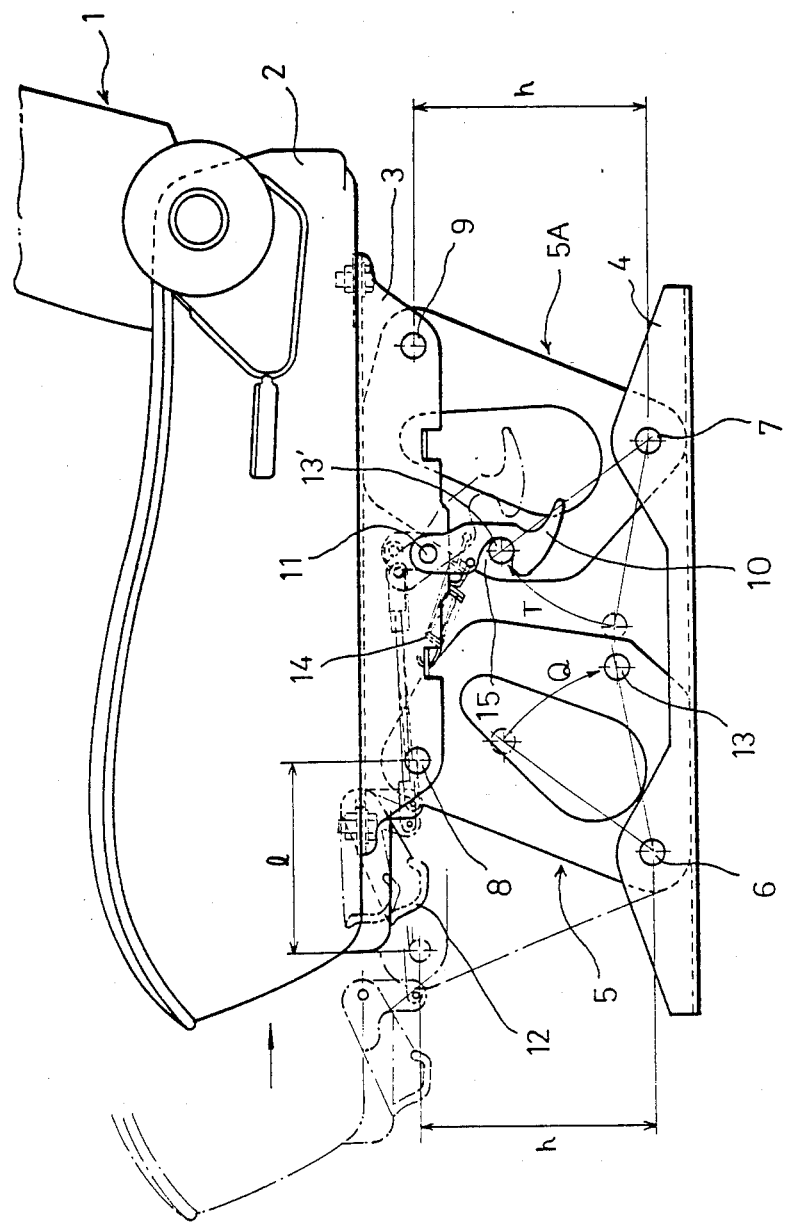
FIG. 2 illustrates the movement of a seat utilizing the device of the present invention from a forward position to a back position.
Figure 3:
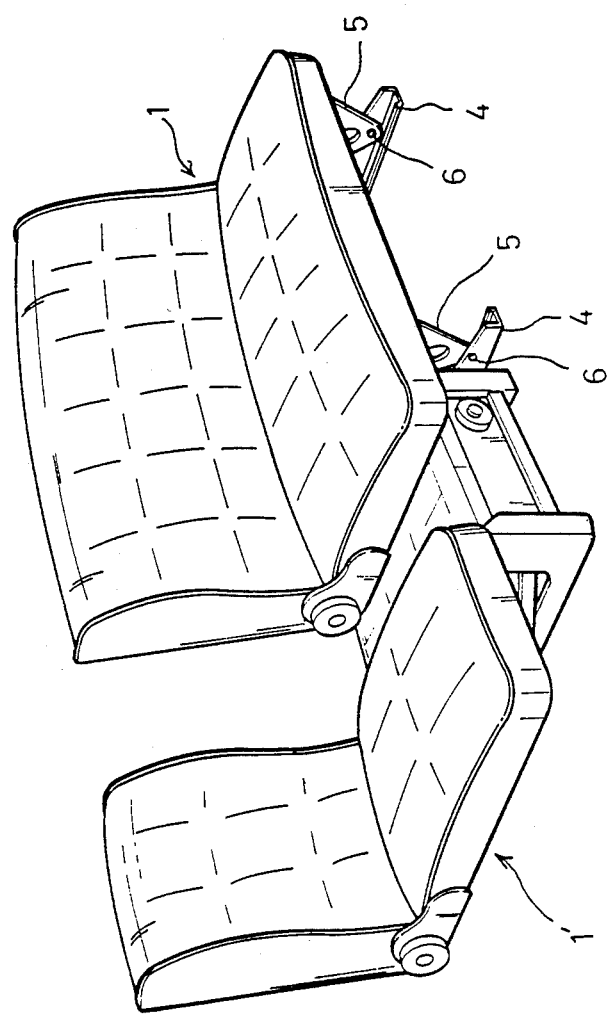
FIG. 3 illustrates a perspective view of a seat having a device made according to the invention.

Referring now to FIGS. 1, 2 and 3, a device made according to the present invention is illustrated. The device comprises a seat bracket 3 fixed at the cushion 2 of the main seat 1, a fixed bracket 4 secured to the bottom of the automobile, legs 5 and 5A hinged to the brackets 3 and 4 by bolts 6, 7, 8, and 9, and a locking link 10 hinged to the seat bracket 3 by a bolt 11. A handle 12 is also provided.

The legs 5 and 5A include contacting sides 5', 5", 5A', 5A" respectively. The legs 5 and 5A include pins 13 and 13' that cooperate with a link 10 that includes a groove 15 as discussed in detail below. The link 10 is secured to a spring 14.

As shown in the FIG. 1, the legs 5 and 5A have a trapezoidal shape and are symmetrically positioned between the two brackets 3 and 4 on opposite sides of the cushion 2 of the main seat 1. As illustrated, the longer sides of the legs 5 and 5A are hinged to the brackets 3 and 4 by means of bolts 6, 7, 8, and 9.

As discussed above, pins 13 and 13' are formed on one side of the legs 5 and 5A to selectively combine with the link 10 according to the moved positions of the seat 1. Because the end of the link 10 is connected to the handle 12, by operating the handle 12, one can disengage the link that is biased forwardly by the spring 14, from the pins 13 and 13'.

As illustrated in FIG. 3, an auxiliary seat 1' is fixed to the main seat 1 through a frame. The auxiliary seat 1' is designed to move with the main seat 1 at the same time that the main seat is moved.

FIG. 1, illustrates the positioning of the device after the main seat has been moved forwardly. As illustrated, in this upper position, side 5' of the left leg 5 contacts the seat bracket 3 in a parallel manner and the lower side 5A" of the right leg 5A contacts the fixed bracket 4 so that the seat can not move in a direction indicated by arrow F any further. In this position, because the pin 13 is locked into the groove 15 of the link 10, thereby restraining the movement of the left leg 5, the position of the main seat 1 is fixed.

When the main seat 1 is required to be moved back, that is, to be moved in the right direction with respect to FIG. 1, the handle 12 is pulled to pivot the link 10, that is engaging the pin 11 by the force of spring 14, thereby unlocking the link 10 from the pin 11. In this position, moving the cushion 2 back makes the left leg 5 pivot at the axis of the bolt 6 until the lower side 5" of the left leg 5 contacts with the fixed bracket 4. Likewise, the right leg 5A will pivot at the axis of the bolt 7 until the upper side 5A' contacts the seat bracket 3. Because the other sides of the legs 5 and 5A are hinged to the seat bracket by another set of bolts 8 and 9 during the above mentioned operation, as illustrated in FIG. 2 the bolts 8 and 9 move back by a horizontal length "l", resulting in the moving of the seat 1 back. Accordingly, the bolts 8 and 9 are so constructed and arranged that the angle between the lower side 5" of the leg 5 in the forward position and the fixed bracket 4 is "θ". Therefore, the cushion 2 can be moved back by a limited position in which the height "h" between two bolts 7 and 9 in the forward position is equal to that in the backward position as shown in the FIG. 2. Also it is similar in case of the right leg 5A.

When the seat cushion 2 is in the back position, as shown in the FIG. 2, the lower side 5" of the left leg 5 contacts the fixed bracket 4, and the pin 13 moves to position Q. At the same time, the pin 13' of the right leg 5A moves to position T in which said pin 13' is positioned in the same horizontal line as was previously occupied by the pin 13 of the left leg 5. As discussed below, this allows the seat to be secured in place.

To move the seat 1 from the forward position back, the pulling force is removed by the handle 12 by unlocking the link 10 from the pin 13 to secure the seat 1 in the back position, the groove 15 of the link 10 locks with the pin 13', so that the forward motion of the leg 5A is restrained.

Summarizing the operation of the device of the present invention, the trapezoidal legs 5 and 5A are hinged at the seat 1 and the fixed brackets 3 and 4 by means of bolts 6, 7, 8, and 9, so as to be reciprocated along an arc-shaped path.

Thus, the seat 1 can be selectively moved back and forth. To secure the seat 1 in a desired position, the link 10, which is connected to the handle 12, cooperates with the pins 13 and 13' formed in the legs 5 and 5A, respectively to lock the legs in position securing the seat 1.

It is also important that in the first position the bolts 8 and 9 move along an arc-shaped path that is parallel to the last position thereof, and that the auxiliary seat 1' connected to the main seat 1 through the frame can be moved with the main seat at the same time.

The device of the present invention overcomes many of the problems encountered in the prior art. The device of the present invention particularly overcomes the problem of abrasion resulting from rubbing, and thus a decrease of the operating life, and tearing of the carpet laying on the bottom.

Because the auxiliary seat 1' is simultaneously moved with the main seat 1 the problems resulting from fixing the auxiliary seat present in the prior art can be easily solved.

Although this invention has been shown and described with respect to a preferred embodiment, it will be understood by those skilled in the art that various changes in form and detail thereof may be made without departing from the spirit and scope of the claimed invention.

I claim:

1. A device for moving an automobile seat back and forth comprising:
    a first and second bracket secured on opposite sides of a main seat;
    a first and second fixed bracket secured to a bottom of the automobile;
    two pairs of legs, for pivotally allowing the seat to move back and forth, a first pair of legs being pivotally secured to said first seat bracket and said first fixed bracket and a second pair of legs being pivotally secured to said second seat bracket and said second fixed bracket, each leg includes a first contacting side for contacting a portion of the seat bracket when the leg is pivoted, and a second contacting side for contacting a portion of the fixed bracket, the first contacting side of a first leg of each pair contacting the seat bracket and the second contacting side of a second leg of each pair contacting the fixed bracket when the legs are in a first position, and the first contacting side of the second leg contacting the seat bracket and the second contacting side of the first leg contacting the fixed bracket when the legs are in a second position;
    the legs each include a pin; and means for securing the legs in the first or second position, secured at a first end to the seat and including a linkage secured to a handle located at a first end of the means for securing the legs and having means for removably receiving one of the pins.

2. The device of claim 1 wherein the means for removably receiving the pins is a locking link having a groove.

3. The device of claim 1 wherein when the legs are in the first position, the means for securing the legs removably receives a pin from one of the legs and when the legs are in the second position the means for securing the legs removably receives a pin from a different leg.

4. The device of claim 1 wherein the legs have a trapezoidal shape.

5. The device of claim 4 wherein each of the legs are secured to the fixed bracket and seat bracket on a longest side of each of the legs.

6. An automobile seat movable back and forth comprising:
    a main seat;
    a pair of brackets secured on opposite sides of the main seat;
    a pair of fixed brackets secured to a bottom of the automobile;
    two pairs of trapezoidal-shaped legs, each pair of legs being pivotally connected, on a longest side, to a different seat bracket and fixed bracket, each leg including a first contacting side and a second contacting side located on opposite sides of the legs, the legs being movable to a first position wherein for each pair of legs the first contacting side of a first leg contacts the seat bracket and a second contacting side of a second leg contacts the fixed bracket and to a second position wherein the first contacting side of the second leg contacts the seat bracket and the second contacting side of the first leg contacts the first bracket;
    the legs cooperating with the main seat to move the seat back and forward depending on if the legs are in the first position or second position; and
    means attached to the seat for removably securing the legs in the first or second position.

7. An automobile seat movable back and forth comprising:
    a main seat;
    a pair of brackets secured on opposite sides of the main seat;
    a pair of fixed brackets secured to a bottom of the automobile;
    two pairs of trapezoidal-shaped legs, each pair of legs being pivotally connected, on a longest side, to a different seat bracket and fixed bracket, each leg including a first contacting side and a second contacting side located on opposite sides of the legs, the legs being movable to a first position wherein for each pair of legs the first contacting side of a first leg contacts the seat bracket and a second contacting side of a second leg contacts the fixed bracket and to a second position wherein the first contacting side of the second leg contacts the seat bracket and the second contacting side of the first leg contacts the fixed bracket;
    the legs cooperating with the main seat to move the seat back and forward depending on if the legs are in the first position or second position, the legs each including a pin; and means for removably securing the legs in the first or second position, the means for securing being coupled at a first end to the seat, the means including a linkage secured to a handle at a first end of the means for securing the legs and having means for removably receiving one of the pins.

8. The automobile seat of claim 7 wherein the means for removably receiving the pins is a locking link having a groove that is spring-biased against the pin.

9. The automobile seat of claim 7 wherein when the legs are in the first position, the means for securing the legs removably receives a pin from one of the legs and when the legs are in the second position the means for securing the legs removably receives a pin from a different leg.

10. The automobile seat of claim 7 wherein the main seat is secured to an auxiliary seat.

11. The automobile seat of claim 7 wherein the legs are so constructed and arranged that the main seat has a constant height whether the legs are in the first position or the second position.

12. An automobile seat movable back and forth comprising:
- a main seat;
- an auxiliary seat secured to the main seat;
- a pair of brackets secured on opposite sides of the main seat;
- a pair of fixed brackets secured to a bottom of the automobile;
- two pairs of trapezoidal-shaped legs, each pair of legs being pivotally connected, on its longest side, to a different seat bracket and fixed bracket, each leg including a first contacting side and a second contacting side, the legs being movable to a first position wherein for each pair of legs the first contacting side of a first leg contacts the seat bracket and the second contacting side of the second leg contacts the fixed bracket and to a second position wherein the first contacting side of the second leg contacts the seat bracket and the second contacting side of the first leg contacts the fixed bracket, and at least one pair of legs includes a pin on each of the first and second legs;
- the legs cooperating with the main seat to move the seat back and forward depending on if the legs are in the first position or second position; and
- a link locking member for removably securing the legs in position by removably receiving one of the pins on the legs, the link locking member being coupled at a first end to the seat and extending at a second end to the legs.

13. The automobile seat of claim 12 wherein the link locking member includes a hangle and a groove, the groove being spring-biased against one of the pins causing the pin to be removably received therein and the handle having means for causing the groove to be disengaged from the pin.

14. The automobile seat of claim 12 wherein when the legs are in the first position, the link locking member receives the pin on the first leg and when the legs are in the second position, the link locking member receives the pin on the second leg.

15. The automobile seat of claim 12 wherein the pins on the first and second legs move in an arc-shaped path as the legs are moved from the first to second position.

16. The automobile seat of claim 12 wherein the legs are so constructed and arranged that the main seat and auxiliary seat have a constant height whether the legs are in the first position or the second position.

* * * * *